United States Patent
Keck et al.

(10) Patent No.: US 6,807,702 B2
(45) Date of Patent: Oct. 26, 2004

(54) CLEANING SYSTEM AND APPARATUS

(75) Inventors: Laura Elizabeth Keck, Alpharetta, GA (US); James Jay Tanner, Winneconne, WI (US); Jeanette Ann Allen, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 73 days.

(21) Appl. No.: 10/315,454

(22) Filed: Dec. 10, 2002

(65) Prior Publication Data

US 2003/0121116 A1 Jul. 3, 2003

Related U.S. Application Data

(62) Division of application No. 09/712,004, filed on Nov. 13, 2000, now abandoned.
(60) Provisional application No. 60/165,403, filed on Nov. 13, 1999, and provisional application No. 60/165,175, filed on Nov. 12, 1999.

(51) Int. Cl.$^7$ .......................... A47L 13/20; A47L 13/22
(52) U.S. Cl. .................. 15/104.94; 15/209.1; 15/231; 428/138
(58) Field of Search .................. 15/104.93, 104.94, 15/208, 209.1, 228, 231, 232; 428/131, 138, 335, 397; 442/361–365, 394, 415

(56) References Cited

U.S. PATENT DOCUMENTS

| | | |
|---|---|---|
| 2,644,185 A | 7/1953 | Weil |
| 2,733,468 A | 2/1956 | Haber |
| 2,764,774 A | 10/1956 | Belsky et al. |
| 2,777,148 A | 1/1957 | Belsky et al. |
| 2,853,730 A | 9/1958 | Belsky et al. |
| 3,015,834 A | 1/1962 | Marrinson et al. |
| 3,077,627 A | 2/1963 | Ashworth |
| 3,199,136 A | 8/1965 | George |
| 3,362,037 A | 1/1968 | Griffin |
| 3,395,416 A | 8/1968 | Hughes |
| 3,412,418 A | 11/1968 | Griffin |
| 3,528,120 A | 9/1970 | Lindstrom |
| 3,593,359 A | 7/1971 | Strauss |
| 3,626,509 A | 12/1971 | Rones |
| 3,698,030 A | 10/1972 | Lockett |
| 3,711,886 A | 1/1973 | Strauss |
| 3,760,450 A | 9/1973 | Griffin et al. |
| 3,792,505 A | 2/1974 | Saltzstein |
| 3,827,099 A | 8/1974 | Allaire et al. |
| 3,827,100 A | 8/1974 | Griffin et al. |
| 3,896,518 A | 7/1975 | Von Post et al. |

(List continued on next page.)

FOREIGN PATENT DOCUMENTS

| | | |
|---|---|---|
| EP | 0 836 842 A2 | 4/1998 |
| EP | 0 857 453 A1 | 8/1998 |
| EP | 0 750 062 B1 | 5/1999 |

(List continued on next page.)

OTHER PUBLICATIONS 3M product literature, New 3M Doodlebuster System, 1981.
Chicopee product literature, "New Chicopee Dusting Tool", 1984.
Swiffer product literature, @http://www.swiffer.com, 1998.

*Primary Examiner*—Terrence R. Till
(74) *Attorney, Agent, or Firm*—Ralph H. Dean, Jr.

(57) ABSTRACT

Absorbent, multilayer cleaning fabrics are provided which have (i) a porous, abrasion resistant liquid pervious top layer, (ii) a liquid impervious bottom layer, and (iii) an absorbent mat sealed between the top and bottom layers. The top and/or bottom layers form highly flexible tabs that extend beyond the absorbent mat and allow the cleaning fabric to be easily attached and removed from a cleaning tool having fasteners. The multilayer cleaning fabrics are well suited for wiping wet surfaces and/or cleaning surfaces with soap and water or other liquid cleaners.

12 Claims, 4 Drawing Sheets

U.S. PATENT DOCUMENTS

| | | |
|---|---|---|
| 3,965,519 A | 6/1976 | Hermann |
| 3,978,541 A | 9/1976 | Gustafsson |
| 4,114,224 A | 9/1978 | Disko |
| 4,209,563 A | 6/1980 | Sisson |
| 4,313,774 A | 2/1982 | Arthur |
| 4,523,347 A | 6/1985 | Tames |
| 4,606,964 A | 8/1986 | Wideman |
| 4,636,429 A | 1/1987 | Morell et al. |
| 4,720,415 A | 1/1988 | Vander Wielen et al. |
| 4,781,966 A | 11/1988 | Taylor |
| 4,784,892 A | 11/1988 | Storey et al. |
| 4,820,579 A | 4/1989 | Aszman |
| 4,823,427 A | 4/1989 | Gibbs et al. |
| 4,852,201 A | 8/1989 | Wundrock et al. |
| 4,951,341 A | 8/1990 | Shears |
| 4,971,471 A | 11/1990 | Sloan |
| 4,995,133 A | 2/1991 | Newell |
| 5,027,468 A | 7/1991 | Leventhal et al. |
| 5,066,527 A | 11/1991 | Newell |
| 5,071,489 A | 12/1991 | Silvenis et al. |
| 5,090,832 A | 2/1992 | Rivera et al. |
| 5,094,559 A | 3/1992 | Rivera et al. |
| 5,128,082 A | 7/1992 | Makoui |
| 5,160,331 A | 11/1992 | Forester et al. |
| 5,227,228 A | 7/1993 | Newell |
| 5,280,664 A | 1/1994 | Lin |
| 5,292,582 A | 3/1994 | Gibbs et al. |
| 5,461,749 A | 10/1995 | Ahlberg et al. |
| 5,470,653 A | 11/1995 | Honeycutt et al. |
| 5,525,397 A | 6/1996 | Shizuno et al. |
| 5,562,642 A * | 10/1996 | Smith et al. .............. 604/289 |
| 5,609,255 A | 3/1997 | Nichols |
| 5,638,569 A | 6/1997 | Newell |
| 5,707,731 A | 1/1998 | Honeycutt et al. |
| 5,707,735 A | 1/1998 | Midkiff et al. |
| 5,801,107 A | 9/1998 | Everhart et al. |
| 5,849,805 A | 12/1998 | Dyer |
| 5,858,504 A | 1/1999 | Fitting |
| 5,858,515 A | 1/1999 | Stokes et al. |
| 5,877,097 A | 3/1999 | West et al. |
| 5,908,707 A | 6/1999 | Cabell et al. |
| 5,944,706 A | 8/1999 | Palumbo et al. |
| 5,948,528 A | 9/1999 | Helms, Jr. et al. |
| 5,960,508 A | 10/1999 | Holt et al. |
| 5,962,112 A | 10/1999 | Haynes et al. |
| 6,003,191 A | 12/1999 | Sherry et al. |
| 6,047,435 A | 4/2000 | Suzuki et al. |
| 6,048,123 A | 4/2000 | Holt et al. |
| 6,101,661 A | 8/2000 | Policicchio et al. |
| 6,119,298 A | 9/2000 | Kenmochi |
| 6,200,669 B1 | 3/2001 | Marmon et al. |
| 6,245,413 B1 | 6/2001 | Kenmochi et al. |
| 6,319,593 B1 | 11/2001 | Kenmochi et al. |
| 6,332,234 B1 | 12/2001 | Graham et al. |

FOREIGN PATENT DOCUMENTS

| | | |
|---|---|---|
| JP | 02-111.484 A | 4/1990 |
| JP | 02-111.485 A | 4/1990 |
| JP | 05025763 | 2/1993 |
| JP | 05056902 A | 3/1993 |
| JP | 06014859 A | 1/1994 |
| JP | 10-005.163 A | 1/1998 |
| JP | 10127547 | 5/1998 |
| WO | 97/04701 | 2/1997 |
| WO | 97/20207 | 6/1997 |
| WO | 97/29178 | 8/1997 |
| WO | 97/35510 | 10/1997 |
| WO | 98/11812 | 3/1998 |
| WO | 98/11813 | 3/1998 |
| WO | 98/18441 | 5/1998 |
| WO | 98/18442 | 5/1998 |
| WO | 98/18444 | 5/1998 |
| WO | 98/18445 | 5/1998 |
| WO | 98/18446 | 5/1998 |
| WO | 98/18447 | 5/1998 |
| WO | 98/23199 | 6/1998 |
| WO | 98/42246 | 10/1998 |
| WO | 98/52458 | 11/1998 |
| WO | 98/52459 | 11/1998 |
| WO | 99/05956 | 2/1999 |
| WO | 99/07273 | 2/1999 |
| WO | 99/09877 | 3/1999 |
| WO | 99/27835 | 6/1999 |
| WO | 99/37200 | 7/1999 |
| WO | 00/27271 | 5/2000 |

* cited by examiner

CLEANING SYSTEM AND APPARATUS

This application is a divisional application of U.S. application Ser. No. 09/712,004, filed Nov. 13, 2000 now abandoned entitled "Cleaning System and Apparatus," which claims priority to provisions application 60/165,175 and 60/165,403 filed on Nov. 12, 1999 and Nov. 13, 1999, respectively.

FIELD OF THE INVENTION

The present invention relates to cleaning sheets and implements and more particularly relates to disposable cleaning sheets and implements for use in wet surface-cleaning applications.

BACKGROUND OF THE INVENTION

Disposable cleaning sheets have heretofore been used in connection with cleaning tools such as mops and brushes. As an example, U.S. Pat. No. 5,461,749 to Ahlberg et al. discloses a floor mop or fabric for picking-up and retaining dust. The cleaning fabric can be attached to a mop head thereby allowing the mop to be used in as a "duster", i.e. a tool or fabric for picking-up dust and other particulate matter. Once the cleaning fabric is soiled it can be removed from the mop head and a new, clean sheet placed therein. A similar product is disclosed in published PCT Application WO97/04701 to Suzuki et al. This publication discloses a flat bag-like cleaning cloth having an insertion space. The head portion of a handle is inserted within the insertion space to form a cleaning apparatus for use as a duster. As a further example, published PCT Application WO98/52548 discloses a sheet material having a macroscopically three-dimensional structure suitable for use a duster in conjunction with a handle or other cleaning tool.

While the aforesaid references provide disposable cleaning sheets suitable for use in dusting or dry surface-cleaning operations, they fail to provide a disposable material suitable for use in wet surface-cleaning operations. However, U.S. Pat. No. 4,823,427 to Gibbs et al. teaches the use of an absorbent elastic mop head cover that can be secured to the mop head without fasteners. The elastic mop head cover can comprise a meltblown fiber fabric and, in one embodiment, can include absorbent materials such as wood pulp or synthetic staple fibers in order to increase the water or oil absorbency of the fabric. While Gibbs provides a durable cleaning sheet suitable for use in wet and/or dry cleaning applications, cleaning sheets having improved durability and an improved capacity to pick up larger and/or coarser particulate matter are desirable. Thus, there exists a need for a cleaning sheets and implements suitable for use in wet surface-cleaning applications which are highly durable, capable of both absorbing and releasing liquids and further which are also capable of picking up dirt and large particulate matter. Still further, there exists a need for such a cleaning sheet that is also sufficiently inexpensive so as to comprise a disposable product.

DESCRIPTION OF THE INVENTION

Figure 1:
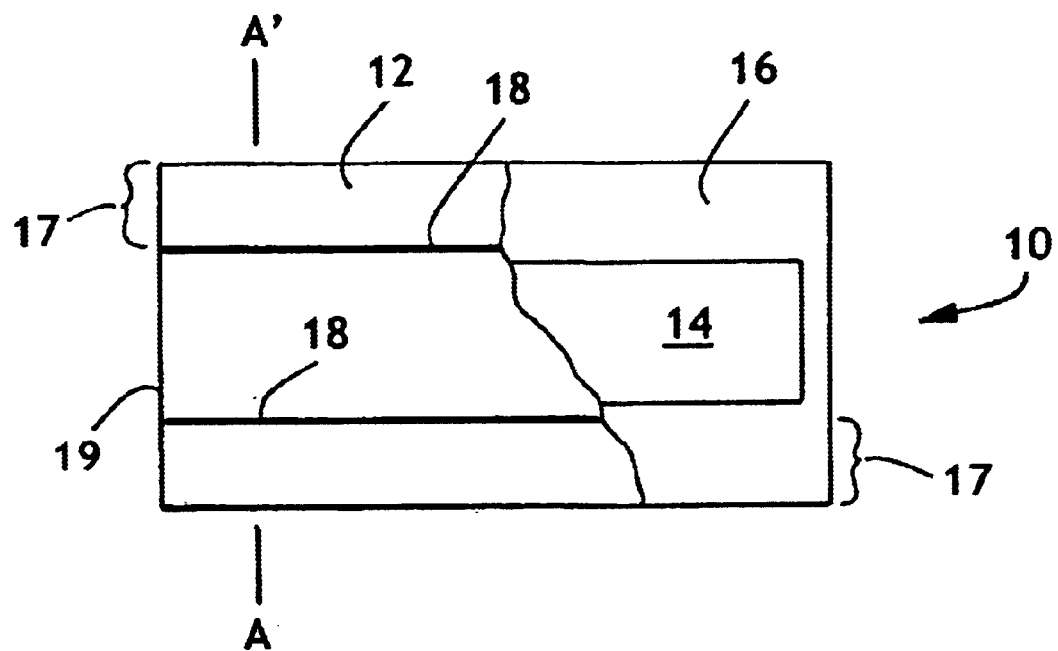
FIG. 1 is a partially broken-away top view of a cleaning sheet of the present invention.

In reference to FIGS. 1–6, cleaning sheet 10 of the present invention can comprise liquid transfer layer 12, absorbent mat 14 and liquid barrier layer 16. Absorbent mat 14 is positioned between liquid transfer sheet 12 and liquid barrier layer 16. Optionally, but not required, the liquid transfer layer 12 may contain apertures 21. Desirably, absorbent mat 14 is permanently sealed between liquid transfer layer 12 and liquid barrier layer 16. In this regard, liquid transfer layer 12 can be laminated to liquid barrier layer 16 at seams 18 and 19. Absorbent mat 14 desirably extends over less than the entire portion of either the cleaning sheet 10, thereby forming one or more highly flexible tabs or flaps 17 which can serve as segments suitable for enveloping and/or attaching to a tool head or other structure.

The size and shape of the cleaning sheet can vary with respect to the intended application and/or end use of the same. Desirably, the cleaning sheet has a substantially rectangular shape of a size which allows it to readily engage standard cleaning equipment or tools such as, for example, mop heads, duster heads, brush heads and so forth. As one particular example, in order to fit a standard mop head, the cleaning sheet may have a length of about 28 cm and a width of about 22 cm. However, the particular size and/or shape of cleaning sheet can vary as needed to fit upon or otherwise conform to a specific cleaning tool. The cleaning sheet can be defined by either the liquid transfer layer and/or the liquid barrier layer. In reference to FIGS. 1–2, liquid transfer layer 12 and liquid barrier layer 16 are co-extensive with one another and thus in this particular embodiment they collectively define the dimensions of the cleaning sheet and together comprise flaps 17. However, in reference to FIG. 3, liquid transfer layer 12 is not co-extensive with liquid barrier layer 16 and liquid transfer layer 12 extends past absorbent mat 14 only an amount sufficient to be attached to liquid barrier layer 16 and encase absorbent mat 14. Thus, in this particular embodiment, liquid barrier layer 16 defines the dimensions of the cleaning sheet and forms flaps 17. In a further embodiment (not shown), the liquid transfer layer can extend beyond both the absorbent mat and liquid barrier layer so as to define the dimensions of the cleaning sheet and form the highly flexible flaps. In this regard, the liquid barrier layer can marginally extend beyond the absorbent mat in order to allow bonding to the liquid transfer layer and encasing of the absorbent mat.

The size of the absorbent core or mat relative to that of the cleaning sheet can likewise vary. Further, the absorbent mat can be positioned within the cleaning sheet as desired. Generally, however, it will be desirable to centrally locate the absorbent mat within the cleaning sheet. Desirably, the length and/or width of the absorbent mat are less than that of the cleaning sheet. In such instance the cleaning sheet will have a highly flexible region or "flap" under which the absorbent mat does not extend. The flaps desirably extend about 5 cm or more past the absorbent layer. The absorbent mat can have a narrower width, such as depicted in FIGS. 1–4, thereby forming flaps 17 that extend along the length of the sheet. In a further aspect and in reference to FIGS. 5–6, absorbent mat 14 can have a shorter length than the cleaning sheet thereby forming flaps 17 that extend along the width of the cleaning sheet. In a further embodiment, the absorbent mat can have a length and width significantly less than that of the cleaning sheet thereby providing flaps that extend along both the length and width of the sheet.

The multiple layers can be attached to one another by one or more methods known in the art. Desirably, the layers are bonded in a manner so as to hold the absorbent mat in a substantially fixed position between the outer layers. As an example, each of the respective layers can be bonded together to form an integrated laminate through the use of adhesives. In a further aspect, the layers can be attached by mechanical means such as, for example, by stitching. Still further, the multiple layers can be thermally and/or ultrasonically laminated together to form an integrated laminate. In reference to FIGS. 1–6, liquid transfer layer 12 and liquid barrier layer can be thermally bonded together along seams 18 and 19 thereby encasing absorbent mat 14. Seams 18 and 19 are desirably proximate absorbent mat 14 so as to prevent significant movement of the absorbent mat within the cleaning sheet. When the liquid transfer layer 12 is coextensive with liquid barrier 16, additional bonding may be desired so that the layers remain together. In this regard, liquid transfer layer 12 and barrier layer 16 can be bonded across the entire width and/or length of the article such as, for example, at or near the edge of the article. In addition, many of the absorbent mats suitable for use in the present invention are capable of expanding in volume and/or bulk. Thus, so as not to lessen the full absorbent capacity of absorbent mat 14 it will often be desirable to leave enough space between the outer layers to allow for expansion of the absorbent material upon taking-up water or other liquids.

The liquid transfer layer desirably comprises a highly porous material that readily allows and/or facilitates the transfer of liquids in and out of the cleaning sheet. Additionally, the liquid transfer layer also needs to be sufficiently durable and strong to withstand the rigors associated with hard surface cleaning. Desirably the liquid transfer layer has a minimum Grab Tensile of about 7 kg. Additionally, the liquid transfer layer desirably has a minimum abrasion resistance of at least 500 cycles (as measured by the Reciprocal Abrasion Test) and still more desirably has a minimum abrasion resistance of at least 1000 cycles. In addition, the liquid transfer layer desirably has a sufficient degree of openness to have a Frazier Porosity of at least about 200 cubic feet/square foot/minute. The liquid transfer layer desirably comprises a material having a basis weight below about 64 g/m$^2$ and still more desirably a material having a basis weight between about 15 g/m$^2$ and about 50 g/m$^2$. An exemplary material comprises spunbond fiber webs such as, for example, those described in U.S. Pat. No. 5,382,400 to Pike et al., U.S. Pat. No. 5,874,460 to Keck, U.S. Pat. No. 5,460,884 to Kobylivker et al., U.S. Pat. No. 5,858,515 to Stokes et al., U.S. Pat. No. 5,707,735 to Midkiff et al., and U.S. application Ser. No. 08/756426 to Marmon et al., now U.S. Pat. No. 6,200,669; the entire contents of each of the aforesaid references are incorporated herein by reference. The fibers can be round or have one or more various shapes such as for example, multilobal, wedge shaped, crescent shaped, ribbon shaped and so forth. In addition, perforated films and fabrics are also well suited for use as or in the liquid transfer layer. Exemplary perforated nonwoven fabrics include, but are not limited to, those described in U.S. Pat. No. 5,858,504 to Fitting, U.S. Pat. No. 5,188,625 to Van Iten et al., U.S. Pat. No. 5,620,779 to Levy et al., U.S. Pat. No. 3,949,127 to Ostermeier et al. and U.S. Pat. No. 4,154,885 to Tecl et al.; the entire contents of each of the aforesaid references are incorporated herein by reference. In addition, highly porous or open fabrics having varied or irregular surfaces, e.g. projections or undulations, are also believed suitable for use in the present invention. Exemplary materials of this type include, but not limited to, those described in U.S. Pat. No. 4,741,941 to Englebert et al., U.S. Pat. No. 4,970,104 to Radwanski and U.S. Pat. No. 5,643,653 to Griesbach et al.; the entire contents of each of the aforesaid references are incorporated herein by reference. Further, the liquid transfer layer can comprise an apertured film. Apertured films believed suitable for use with the present invention and methods of making the same are described in U.S. Pat. No. 4,280,978 to Danhiem et al., U.S. Pat. No. 5,370,764 to Alikhan and U.S. Pat. No. 5,262,107 to Hovis et al. In addition, the liquid distribution layer can comprise multilayer laminates of two or more of materials. As a particular example, the liquid distribution layer can comprise an apertured film/nonwoven web laminate.

Absorbent layers or mats can comprise a material or combination of materials that provide good absorbency as well as liquid-release properties. Thus, in addition to being absorbent, the absorbent material should be capable of releasing absorbed liquid upon the application of pressure. The absorbent layer desirably has a substantially uniform thickness. Additionally, the absorbent layer is desirably thin yet provides adequate absorbent capacity. Further, the absorbent mat desirably comprises a material which is wet-resilient and that maintains good absorbency characteristics after multiple absorbing and compressing (i.e. liquid-release) steps. In this regard, the absorbent mat desirably is capable of substantially retaining its shape and stiffness when wet in order to prevent bunching and/or rolling during use. The absorbent mat desirably has an absorbency (i.e. absorbent capacity) of at least about 15 g/g, and still more desirably an absorbency of at least about 20 g/g. In addition, the absorbent mat desirably has a thickness less than about 1.25 cm and still more desirably between about 0.3 cm and about 1.25 cm. Further, as indicated above, the absorbent material desirably has a length and/or width so as to allow formation of flaps having the desired dimensions.

The absorbent core or mat can, in one aspect, comprise a mixture or stabilized matrix of pulp and substantially continuous thermoplastic fibers and/or thermoplastic staple fibers. The absorbent core desirably comprises a combination or mixture of thermoplastic fibers and an absorbent material structured such that the pulp or other absorbent is substantial held in place. The absorbent material can comprise coform materials although other suitable absorbent fabrics comprising a combination of thermoplastic fibers and absorbent material may likewise be used in accord with the present invention. Exemplary coform materials are disclosed in commonly assigned U.S. Pat. No. 5,284,703 to Everhart et al., U.S. Pat. No. 5,350,624 to Georger et al., U.S. Pat. No. 4,784,892 to Maddern et al. and U.S. Pat. No. 4,100,324 to Anderson et al.; the entire contents of each of the aforesaid references are incorporated herein by reference. The term "coform material" generally refers to composite materials comprising a stabilized matrix of thermoplastic fibers and a second non-thermoplastic material. As an example, coform materials may be made by a process in which at least one meltblown die head is arranged near a chute through which pulp and/or other absorbent materials are added to the web while it is forming. Suitable absorbents include, but are not limited to, fibrous organic materials such as woody or non-woody pulp such as cotton, rayon, recycled paper, wood pulp fluff, cellulose and/or cellulosic staple fibers, and also include inorganic absorbent materials such as superabsorbent materials and/or treated polymeric staple fibers. As a particular example, the coform material desirably has a basis weight between about 20 g/m² and about 250 g/m² and desirably comprises from about 5% to about 45% thermoplastic polymer fibers. As a specific example, the coform material can comprise polypropylene meltblown fibers and wood pulp.

Additional absorbent materials suitable for use in forming the absorbent core or mat also include densified pulp products such as, for example, those described in commonly assigned U.S. patent application Ser. No. 09/290,713 filed Apr. 12, 1999 to Fontenot et al., now U.S. Pat. No. 6,368,609, and U.S. Pat. No. 5,779,860 to Hollenberg et al.; the entire contents of each of the aforesaid references are incorporated herein by reference. In order to achieve improved wet-resiliency, the absorbent mat desirably comprises a composite structure of pulp and thermoplastic polymer fibers. As a specific example, the absorbent mat can comprise an airlaid composite that is made of pulp fibers and at least about 2% by weight bicomponent fibers. The pulp fibers are desirably mixed with the bicomponent fibers in such a way so as to produce a substantially homogeneous airlaid composite. The bicomponent fibers desirably include a first polymer component and a second polymer component wherein the first polymer component melts at a temperature lower than the melting temperature of the second polymer component. As an example, the bicomponent fibers can comprise polyethylene/polyester (sheath/core) fibers having a length less than about 1.5 inches (3.81 cm) with a denier between about 1.5 to 4. The pulp fibers can have an average fiber length of at least about 2 mm, preferably 2–3 mm, and are desirably present within the composite in the range of about 70–98% by weight of the composite. Various pulp fibers can be utilized including, but not limited to, thermomechanical pulp fibers, chemithermomechanical pulp fibers, chemimechanical pulp fibers, refiner mechanical pulp fibers, stone groundwood pulp fibers, peroxide mechanical pulp fibers and so forth. After forming the batt, the airlaid composite is preferably heated such that at least a portion of the first polymer component of the bicomponent fibers is melted, thereby bonding the bicomponent fibers to the pulp and bicomponent fibers when cooled. Moisture can then, optionally, added on to the composite to further facilitate bonding when the composite is subsequently subjected to calendering. The airlaid composite is desirably calendered from an initial thickness of approximately 0.50 inches to 0.75 inches (1.27–1.91 cm) and density of about 0.02–0.05 g/cc. The pulp composite can be calendered or compressed as desired to achieve an absorbent mat having the desired thickness and absorbency characteristics. The airlaid composite can be calendered before or after incorporation within the cleaning sheet. In one aspect, the pulp composite can be compressed at a pressure of about 800 to 4000 pounds per linear inch (pli) (143–715 kg/linear cm) to form a thin, calendered airlaid composite having a thickness to basis weight ratio of $3.0 \times 10^{-3}$ mm/1 gsm to $1.0 \times 10^{-3}$ mm/1 gsm, a thickness of 0.025 –0.15 cm and a density of 0.1 g/cc or higher.

The liquid barrier layer desirably comprises a material that substantially prevents the transmission of liquids under the pressures and chemical environments associated with surface cleaning applications. Desirably, the liquid barrier layer comprises a thin, monolithic film. The film desirably comprises a thermoplastic polymer such as, for example, polyolefins (e.g., polypropylene and polyethylene), polycondensates (e.g., polyamides, polyesters, polycarbonates, and polyarylates), polyols, polydienes, polyurethanes, polyethers, polyacrylates, polyacetals, polyimides, cellulose esters, polystyrenes, fluoropolymers and so forth. Desirably the film is hydrophobic. Additionally, the film desirably has a thickness less than about 2 mil and still more desirably between about 0.5 mil and about 1 mil. As a particular example, the liquid barrier layer can comprise an embossed, polyethylene film having a thickness of approximately 1 mil.

In addition, one or more of the polymeric components within the cleaning sheet can contain minor amounts of compatibilizing agents, colorants, pigments, optical brighteners, opacifying agents, ultraviolet light stabilizers, antistatic agents, wetting agents, additives for improving abrasion resistance, nucleating agents, fillers and/or other additives and processing aids. As an example, the liquid barrier layer can contain opacifying agents, e.g. $TiO_2$, in order to provide a white, substantially opaque film.

Figure 7:
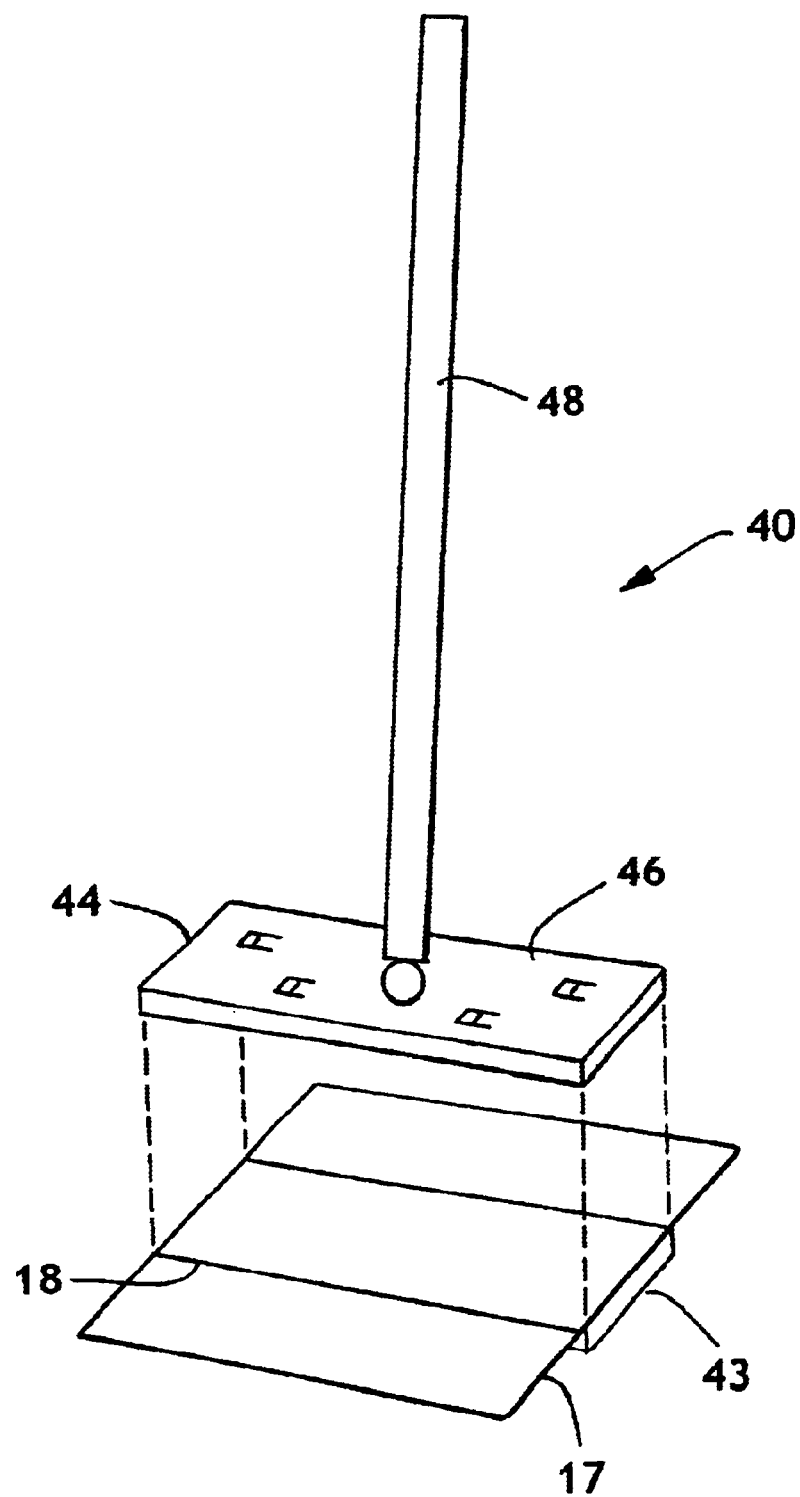
FIG. 7 is a perspective view of a cleaning apparatus of the present invention.

As indicated herein above, the cleaning sheets of the present invention are well suited for use with a variety of cleaning equipment and, more particularly, is readily capable of being releasably-attached to the head of a cleaning tool. As used herein, "releasably-attached" or "releasably-engaged" means that the sheet can be readily affixed to and thereafter readily removed from the cleaning tool. In reference to FIG. 7, cleaning tool 40 can comprise handle 48, head 44 and fasteners 46. Cleaning sheet 43 can be superposed with and placed against head 44 such that the liquid barrier layer 16 faces head 44. Flaps 17 can then be wrapped around head 44 and releasably-attached to head 44 by fasteners 46, e.g. clamps. With cleaning sheet 43 affixed to head 44, cleaning tool 40 can then be used in one or more wet cleaning operations. Thereafter, when the cleaning sheet becomes heavily soiled or otherwise spent, the used sheet can be quickly and easily removed and a new one put in its place. The specific configuration of the cleaning tool can vary in many respects. As examples, the size and/or shape of the handle can vary, the head can be fixed or moveable (e.g. pivotable) with relation to the handle, the shape and/or size of the head can vary, etc. Further, the composition of the head can itself vary, as but one example the head can comprise a rigid structure with or without additional padding. Further, the mechanism(s) for attaching the cleaning sheet can vary and exemplary means of attachment include, but are not limited to, hook and loop type fasteners (e.g. VELCRO fasteners), clamps, snaps, buttons, flaps, cinches, low tack adhesives and so forth.

The cleaning sheets of the present invention are well suited for a variety of wet cleaning operations such as: mopping floors; cleaning and drying wet surfaces such as counters, tabletops or floors (e.g. wet surfaces resulting from spills); sterilizing and/or disinfecting surfaces by applying liquid disinfectants; wiping down and/or cleaning appliances, machinery or equipment with liquid cleansers; rinsing surfaces or articles with water or other diluents (e.g. to remove cleaners, oils, etc.), and so forth. The cleaning sheets have numerous uses as a result of its combination of physical attributes. In this regard, the absorbent mat allows the cleaning sheet not only to absorb and retain water but also to release absorbed liquids upon the application of pressure. In addition, the liquid transfer layer provides a porous medium which permits the uptake and release of liquid as well as one which is capable of picking-up dirt, crumbs and other particulate matter. Additionally, the liquid transfer layer also provides a durable cleaning surface with good abrasion resistance that helps maintain the integrity of the absorbent mat. This combination of physical attributes is highly advantageous for cleaning surfaces with liquids such as soap and water or other common household cleaners. Further, the cleaning fabrics of the present invention are of a sufficiently low cost to allow disposal after either a single use or a limited number of uses. By providing a disposable absorbent cleaning fabric it is possible avoid problems associated with permanent or multi-use absorbent products such as, for example, cross-contamination and the formation of bad odors, mildew, mold, etc.

The cleaning sheets can be provided dry or pre-moistened. In one aspect, dry cleaning sheets can be provided with dry or substantially dry cleaning or disinfecting agents coated on or in either the scrubbing layer or absorbing layer. In addition, the cleaning sheets can be provided in a pre-moistened and/or saturated condition. The wet cleaning sheets can be maintained over time in a sealable container such as, for example, within a bucket with an attachable lid, sealable plastic pouches or bags, canisters, jars, tubs and so forth. Desirably the wet, stacked cleaning sheets are maintained in a resealable container. The use of a resealable container is particularly desirable when using volatile liquid compositions since substantial amounts of liquid can evaporate while using the first sheets thereby leaving the remaining sheets with little or no liquid. Exemplary resealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5,595,786 to McBride et al.; the entire contents of each of the aforesaid references are incorporated herein by reference. The cleaning sheets can be incorporated or oriented in the container as desired and/or folded as desired in order to improve ease of use or removal as is known in the art.

With regard to pre-moistened sheets, a selected amount of liquid is added to the container such that the cleaning sheets contain the desired amount of liquid. Typically, the cleaning sheets are stacked and placed in the container and the liquid subsequently added thereto. The sheet can subsequently be used to wipe a surface as well as act as a vehicle to deliver and apply cleaning liquids to a surface. The moistened and/or saturated cleaning sheets can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto. The amount and composition of the liquid added to the cleaning sheets will vary with the desired application and/or function of the wipes. As used herein the term "liquid" includes, but is not limited to, solutions, emulsions, suspensions and so forth. Thus, liquids may comprise and/or contain one or more of the following: disinfectants; antiseptics; diluents; surfactants, such as nonionic, anionic, cationic, waxes; antimicrobial agents; sterilants; sporicides; germicides; bactericides; fungicides; virucides; protozoacides; algicides; bacteriostats; fungistats; virustats; sanitizers; antibiotics; pesticides; and so forth. Numerous cleaning compositions and compounds are known in the art and can be used in connection with the present invention.

Tests

Absorption Capacity: a 4 inch (101.6 mm) by 4 inch (101.6 mm) specimen is initially weighed. The weighed specimen is then soaked in a pan of test fluid (e.g. water) for three minutes. The test fluid should be at least three centimeters deep in the pan. The specimen is removed from the test fluid and allowed to drain while hanging in a vertical position. The specimen is allowed to drain for one minute. After the allotted drain time the specimen is placed in a weighing dish and then weighed. Absorption Capacity (g)= wet weight (g)–dry weight (g); and Specific Capacity (g/g)= Absorption Capacity (g)/dry weight (g).

Grab Tensile test: The grab tensile test is a measure of breaking strength and elongation or strain of a fabric when subjected to unidirectional stress. This test is known in the art and conforms to the specifications of Method 5100 of the Federal Test Methods Standard 191A. The results are expressed in pounds or grams to break and percent stretch before breakage. Higher numbers indicate a stronger, more stretchable fabric. The term "load" means the maximum load or force, expressed in units of weight, required to break or rupture the specimen in a tensile test. The term "total energy" means the total energy under a load versus elongation curve as expressed in weight-length units. The term "elongation" means the increase in length of a specimen during a tensile test. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength and grab elongation are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 Tester, available from the Sintech Corporation, 1001 Sheldon Dr., Cary, N.C. 27513, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154. Results are reported as an average of three specimens and may be performed with the specimen in the cross direction (CD) or the machine direction (MD).

Frazier Air Permeability: This test determines the airflow rate through a specimen for a set area size and pressure. The higher the airflow rate per a given area and pressure, the more open the material is, thus allowing more fluid to pass therethrough. The air permeability data reported herein was obtained using a TEXTEST FX 3300 air permeability tester.

Reciprocal Abrasion Test: The "reciprocating abrasion test" (RAT) involves stroking a sample, usually 5.5 inch by 7 inch (140 mm by 180 mm) of fabric with a silicone rubber abrasive and then evaluating the fabric for pilling, roping and fuzzing. The horizontally reciprocating dual head abrasion tester is Model no. 8675 from United States Testing Company, Inc. of Hoboken N.J. The abradant is a solid rubber fiber glass reinforced material having a rubber surface hardness of 81A Durometer, a Shore A of 81 (±9) and is 36 inches (914 mm) by 4 inches (102 mm) by 0.005 inches (0.127 mm) thick and is available as catalogue no. 4050 from Flight Insulations Inc., (distributors for Connecticut Hard Rubber) of Marietta, Ga. The abradant should be conditioned by cycling it over a scrap piece of the material to be tested about 200 times. The test sample should be free of folds, creases etc., mounted in the instrument on cork backing with the coarse fiber layer facing up and cleaned of residual surface fibers with a camel hair brush. The abradant arm should be lowered and the cycling begun at a total weight of 1180 g with half of the weight on each of the two abradant arms. The cycling of the abradant over the specimen is repeated until formation of extensive fiber pilling and surface destruction.

EXAMPLES

Example 1

The liquid distribution layer comprised a 33.9 g/m² nonwoven web of polypropylene spunbond fibers bonded in accord with U.S. Pat. No. 5,858,151. The absorbent layer comprised a 400 g/m² web of a compressed pulp/staple fiber composite such as described in U.S. application Ser. No. 09/290,713. The liquid barrier layer comprised an embossed polyethylene film having a thickness of 1 mil. The embossed film had a white, opaque appearance and contained $TiO_2$ particles. The liquid distribution layer and liquid barrier layer each had a length of 27 cm and a width of 22 cm. The absorbent layer had a length of 25 cm and a width of 10 cm. The three layers were juxtaposed and the absorbent layer was centrally placed between the outer two layers as depicted in FIG. 1. Thereafter the liquid distribution layer and liquid barrier layer were thermally bonded along four seams as depicted in FIG. 1. Two seams extended immediately adjacent the absorbent layer along the fabrics' length and two seams extended across the fabrics' width proximate the edges. The resulting flaps had a width of 6 cm.

Example 2

Figure 2:
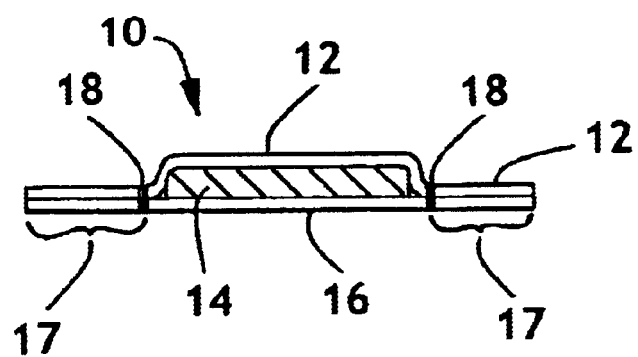
FIG. 2 is a cross-sectional side view, taken at A–A', of the absorbent cleaning sheet of FIG. 1.
Figure 3:
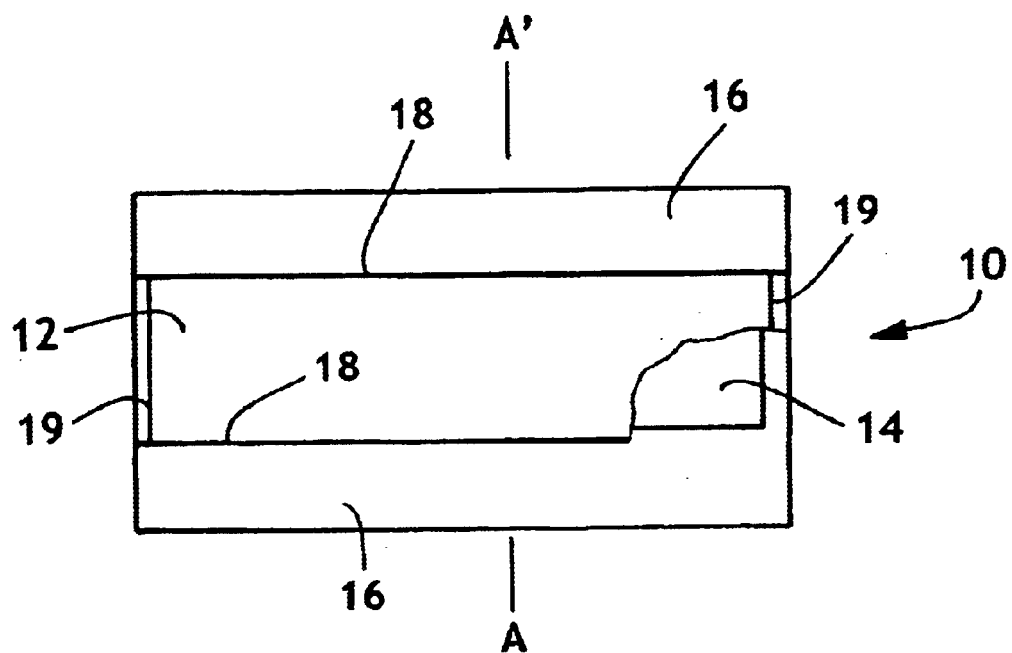
FIG. 3 is a partially broken-away top view of a cleaning sheet of the present invention.
Figure 4:
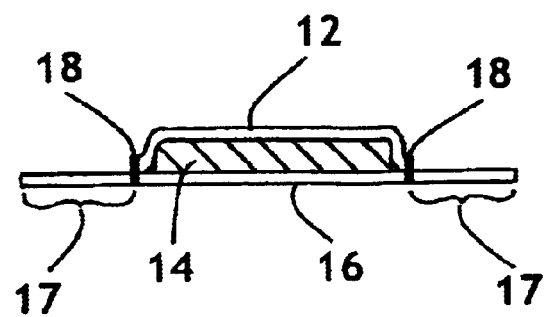
FIG. 4 is a cross-sectional side view, taken at A–A', of the absorbent cleaning sheet of FIG. 3.
Figure 5:
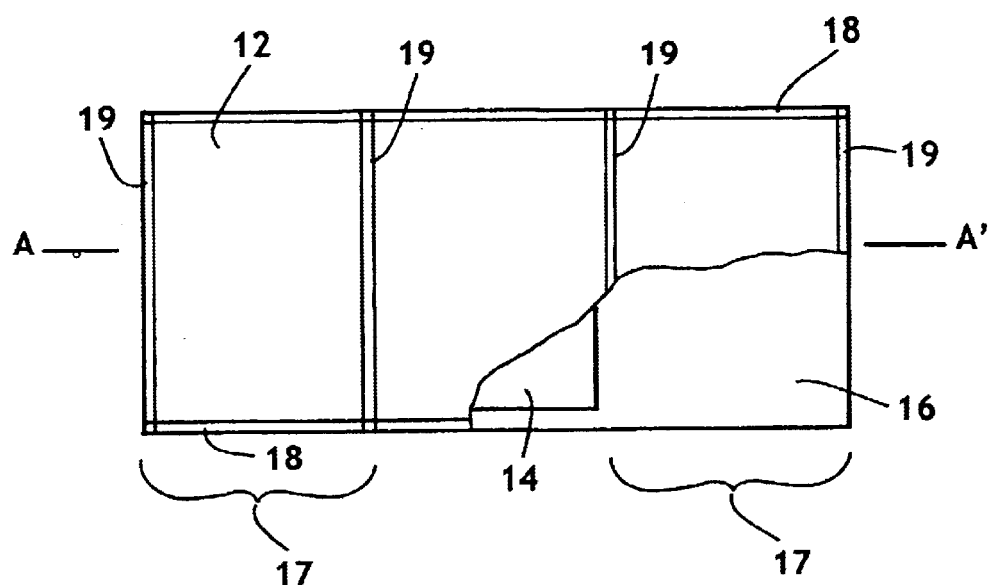
FIG. 5 is a partially broken-away top view of a cleaning sheet of the present invention.
Figure 6:
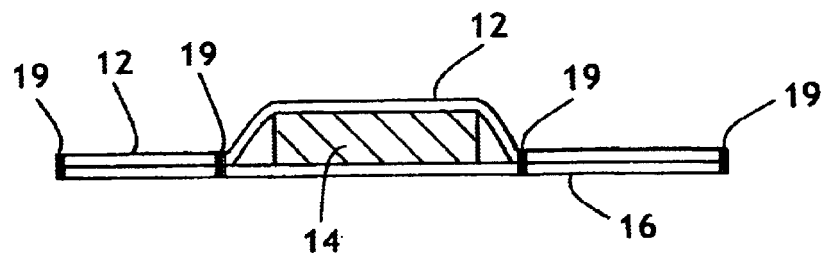
FIG. 6 is a cross-sectional side view, taken at A–A', of the absorbent cleaning sheet of FIG. 5.

The liquid transfer layer comprised a 48 g/m² multilayer structure comprising an apertured polyethylene film and a through-air bonded carded web of polyethylene/polypropylene staple fibers. The absorbent layer comprised a 400 g/m² web of a compressed pulp/staple fiber composite such as described in U.S. application Ser. No. 09/290,713. The liquid barrier layer comprised an embossed, opaque polyethylene film having a thickness of 1 mil and contained $TiO_2$ particles. The liquid distribution layer had a length of 27 cm and a width of 15 cm. The liquid barrier layer had a length of 27 cm and a width of 22 cm. The absorbent layer had a length of 25 cm and a width of 10 cm. The three layers were juxtaposed and the absorbent layer was centrally placed between the outer two layers as depicted in FIG. 2. The film layer of the liquid transfer layer was placed adjacent the absorbent layer. Thereafter the liquid transfer layer and liquid barrier layer were thermally bonded along four seams; two seams extended immediately adjacent the absorbent layer along the fabrics' length and two seams extended across the fabrics' width proximate the edges. The resulting flaps had a width of 6 cm.

While the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

What is claimed is:

1. A pre-moistened multilayer cleaning fabric comprising:
   a liquid transfer layer;
   a liquid barrier layer; and
   an absorbent material positioned between said liquid transfer layer and said liquid barrier layer, said absorbent material comprising a mixture of thermoplastic polymer fibers and pulp, and said absorbent material further comrising a liquid.

2. The pre-moistened multilayer cleaning fabric of claim 1 wherein said absortent material comprises a stabilized matrix of thermoplastic polymer fibers and pulp.

3. The pre-moistened multilayer cleaning fabric of claim 2 wherein said absorbent material comprises a stabilized matrix of meltblown fibers and pulp.

4. The pre-moistened multilayer cleaning fabric of claim 3 wherein said meltblown fibers comprise polypropylene fibers.

5. The pre-moistened multilayer cleaning fabric of claim 1 wherein said liquid transfer layer comprises a nonwoven web of spunbond fibers.

6. The pre-moistened multilayer cleaning fabric of claim 5 wherein said liquid transfer layer has an abrasion resistance of at least 500 cycles.

7. The pre-moistened multilayer cleaning fabric of claim 5 wherein said liquid transfer layer comprises a nonwoven web of spunbond fibers having a cross-sectional shape selected from the group consisting of multilobal, crescent, and wedge shaped fibers.

8. The pre-moistened multilayer cleaning fabric of claim 5 where said liquid transfer layer comprises a nonwoven web of split spunbond fibers.

9. The pre-moistened multilayer cleaning fabric of claim 5 wherein said liquid transfer layer contains a plurality of apertures therein.

10. The pre-moistened multilayer cleaning fabric of claim 1 wherein said absorbent material has an absorbency of at least about 15 g/g.

11. The pre-moistened multilayer cleaning fabric of claim 1 wherein said liquid transfer layer comprises an apertured nonwoven web and has an abrasion resistance of at least 500 cycles.

12. A cleaning implement comprising:
    a handle
    ahead; and
    the cleaning sheet of claim 1, wherein said liquid barrier layer faces said head and further wherein said cleaning fabric is releasably engaged with said head.

* * * * *